(12) United States Patent
Gray, Jr.

(10) Patent No.: US 6,170,524 B1
(45) Date of Patent: Jan. 9, 2001

(54) FAST VALVE AND ACTUATOR

(75) Inventor: Charles L. Gray, Jr., Pickney, MI (US)

(73) Assignee: The United States of America as represented by the Administrator of the Environmental Protection Agency, Washington, DC (US)

( * ) Notice: Under 35 U.S.C. 154(b), the term of this patent shall be extended for 0 days.

(21) Appl. No.: 09/558,165

(22) Filed: Apr. 26, 2000

Related U.S. Application Data (63) Continuation-in-part of application No. 09/316,088, filed on May 21, 1999, now abandoned.

(51) Int. Cl.[7] .................................................. F16K 31/02
(52) U.S. Cl. ............................ 137/625.18; 137/625.65; 251/31; 251/129.07; 251/129.1; 123/458; 91/466
(58) Field of Search ..................... 137/625.18, 625.65, 137/625.25, 625.66, 625.67; 251/129.07, 129.1, 64, 31, 28, 30.01; 123/506, 459, 458; 91/466

(56) References Cited

U.S. PATENT DOCUMENTS

| | | | |
|---|---|---|---|
| 885,459 | * 4/1908 | Engler et al. | 123/90.12 |
| 974,413 | * 11/1910 | Mercer | 137/625.66 |
| 2,584,127 | * 2/1952 | Harcum et al. | 123/506 X |
| 4,359,032 | * 11/1982 | Ohie | 123/458 |
| 4,365,563 | * 12/1982 | Wu | 137/625.18 X |
| 4,465,049 | * 8/1984 | Eckert et al. | 123/506 X |
| 4,665,936 | * 5/1987 | Furrer | 251/129.01 X |
| 4,759,527 | * 7/1988 | Brown | 251/118 |
| 4,770,389 | * 9/1988 | Bodine et al. | 251/129.1 |
| 5,074,259 | * 12/1991 | Pusic | 251/129.1 X |
| 5,638,781 | * 6/1997 | Sturman | 123/90.12 |

* cited by examiner

Primary Examiner—John Rivell
Assistant Examiner—Meredith H Schoenfeld
(74) Attorney, Agent, or Firm—Lorusso & Loud (57) ABSTRACT

A fast-acting valve includes a valve body and a spool slidably mounted within the valve body between first and second limit positions. Both the spool and the valve body have a flow passage which come into alignment with the valve spool at a position intermediate the first and second limit positions and spaced therefrom by a given distance. That given distance allows the spool member to accelerate in travel from the first and second limit positions to the valve open position so that the opening of the valve (and closing) occurs quite quickly. Reciprocating movement of the valve spool relative to the valve body can be provided by springs mounted in opposing ends of the valve body bore in cooperation with solenoids mounted on opposing sides of the valve body. The fast-acting valve may be modified into the form of poppet valve or a cartridge valve.

20 Claims, 7 Drawing Sheets

FAST VALVE AND ACTUATOR

CROSS REFERENCE TO RELATED APPLICATION

This application is a continuation-in-part of U.S. application Ser. No. 09/316,088 filed May 21, 1999, now abandoned.

BACKGROUND OF THE INVENTION

1. Field of the Invention

The principal utility of the invention is with valve and actuator applications where extremely fast response is very desirable. For example, a piston engine that needs to introduce fuel through direct injection within 30 degrees of crank rotation and that is running at 4000 rpm, has 1.25 milliseconds to open the fuel injection valve, inject the fuel and close the valve. The most apparent field of application is in internal-combustion engines for motor vehicles.

2. Description of the Prior Art

The growing utilization of automobiles has greatly added to the atmospheric concentration of various pollutants including oxides of nitrogen and greenhouse gases such as carbon dioxide. In a quest for approaches which could significantly improve the efficiency of fuel utilization for automotive powertrains, while still achieving low levels of NOx emissions, the need for fast valves and actuators became apparent and this invention was conceived.

Conventional "fast" valves begin a valving change from either an open or closed position. In the closed position the "movable component" of the valve has "sealed" (usually against a seat or, in a spool valve, by positioning the spool so that flow from the high pressure port is blocked). A command to open results in a force being applied to the movable component, and movement (i.e., acceleration) of the mass of the movable component begins according to the following equation:

$$\frac{F}{M} = a$$

Where:

"F" is the force applied to the movable component

"M" is the mass of the movable component

"a" is the acceleration of the movable component that results

The time required to move the movable component from the closed position to the fully open position is the time needed for valve opening, and this time is dependent on the acceleration and the distance the movable component must cover from the closed position to the fully open position. Conventional "fast" valves maximize acceleration by applying a very large force, minimize the mass of the movable components and minimize the travel distance by valve design to the extent possible. Extremely fast valve action (e.g., less than 1 millisecond) is therefore very difficult to achieve with conventional designs. Conventional valve designs begin the opening stage with an initial speed of zero. The acceleration rate results in a maximum speed that occurs at the end of the opening process. The average speed is therefore determined by the initial speed (i.e., zero) and the final speed, and for a near constant acceleration rate the average speed is about one half the final speed. Since the time for opening a conventional valve is the distance needed for travel to fully open the flow ports divided by the average speed, starting the valve opening from zero speed severely constrains the ability to obtain very fast valve openings.

In a conventional spool valve the "OFF" position has the spool valve port slightly withdrawn from communication with the passage through the valve body in order to provide a seal against leakage. See, for example, U.S. Pat. No. 4,770,389 issued to Bodine. This conventional sealing distance is not intended to allow the valve spool to accelerate prior to starting to open and, in fact, acceleration through a sealing zone in a conventional valve is de minimus, i.e., to less than 10% of maximum spool velocity.

In some modern "fast acting valves", the leading edge of the valve port and that of the valve body passage are "line-on-line" in the OFF position. In other words, the leading edges of the two ports are radially aligned with no sealing distance therebetween. In such valves some small amount of leakage is tolerated in order to provide a faster acting valve.

SUMMARY OF THE INVENTION

Accordingly, it is an object of the present invention to provide a valve mechanism which starts the valve port opening at a high initial speed and finishes the port opening near or above this high initial speed then goes through a deceleration zone, thus significantly reducing the time required for opening (and closing) the valve.

Another object of the present invention is to achieve the above-stated objective by a unique valve design which provides acceleration and deceleration zones to provide extremely fast valve opening and closing.

A third object of the present invention is provision of a unique, two-way spool valve incorporating the desired acceleration/deceleration features described above.

A fourth object of the present invention is provision of a unique, three-way spool valve incorporating the desired acceleration/deceleration features described above.

A fifth object of the present invention is provision of a unique control valve for a two-way actuator incorporating the desired acceleration/deceleration features.

A sixth object of the present invention is provision of a unique, two-way cartridge valve incorporating the desired acceleration/deceleration features.

A seventh object of the present invention is provision of a unique fuel injection (or fluid control) system utilizing two valves, having the desired acceleration/deceleration characteristics, for each injector and an appropriately sized high pressure fuel supply line, or line with a flow restrictor such as an orifice.

An eighth object of the present invention is provision of a unique gas flow control valve which a control valve having the desired acceleration/deceleration characteristics, a fast, hydraulic actuator and, integrated with the hydraulic actuator, a poppet valve also having the acceleration/deceleration characteristics of the present invention.

A ninth object of the present invention is provision of a new means for utilizing multiple solenoids in series to maximize and maintain the accelerating force on the movable component (valve member).

A tenth object of the present invention is provision of a unique solenoid actuated valve providing the acceleration/deceleration characteristics of the present invention.

The unique design and operation of this new valve are based on utilization of acceleration and deceleration zones to achieve very fast valve response. The valve provides a zone (i.e., distance) wherein the movable component can be accelerated to a high speed of at least 30% of its maximum velocity before the movable component starts the valve port opening. Therefore, the valve port opening occurs in the shortest time possible. A second zone (i.e., distance) is provided for deceleration of the movable component and this second "deceleration" zone also serves as the acceleration zone for the reverse action of the valve (i.e., closing).

More specifically, in one embodiment the present invention provides a fast-acting valve including a valve body and a valve spool slidably mounted in a bore within the valve body for reciprocating movement in a linear path between first and second limit (rest) positions, i.e. between fully closed and fully open positions. The valve body and the valve spool both have at least one flow passage which align in the valve open position. The flow passage through the valve body is spaced from the one spool fluid flow passage with the valve spool in the fully closed position by a distance including an acceleration zone and a deceleration zone. The acceleration zone may be defined as the distance through which the valve spool accelerates before the one spool fluid flow passage reaches a position initiating fluid communication between it and the one valve body flow passage, i.e. a position where the leading edge of valve spool flow passage enters the one valve body flow passage, whereby the flow passage is very quickly opened. This acceleration zone is significantly longer than the distance required for sealing. The deceleration zone is the distance through which the valve spool decelerates before coming to rest in the fully open position. The fact acting valve of the present invention further includes first and second acceleration/deceleration means for alternately accelerating and decelerating the valve spool in travel between the fully open and fully closed rest positions. An additional drive means is provided in several embodiments for imparting the reciprocating movement to the valve spool. In one preferred embodiment springs or elastic members are mounted within opposing ends of the valve body bore and are compressed by the valve spool at the first and second limit positions, respectively. In this preferred embodiment, the acceleration and deceleration zones are equal in length to the distance a spring extends between a compressed state with the valve spool bearing against it in one of the fully closed and fully open positions and a relatively relaxed state with the valve spool in the other of the fully closed and fully open positions. This embodiment requires a separate motive means or actuator for driving the valve spool with the reciprocating movement and for holding the valve spool against the spring (or other elastic member) in its compressed state. An electromagnetic actuator would include at least one solenoid mounted at each end, surrounding the bore of the valve body.

Preferably, the acceleration zone will be a length through which the spool accelerates to a velocity at least 30% and, more preferably, at least 50% of maximum spool velocity.

In a further preferred embodiment at least two solenoids are mounted at opposing ends of the valve body, surrounding ends of the bore. In this embodiment the solenoids at one end would be energized in succession to accelerate the valve spool while the solenoids at the opposite end would be energized in succession to decelerate the valve spool.

The path through which the valve spool travels may include a gap between acceleration and deceleration zones. Toward this end the diameter of the valve body flow passage may be significantly larger than that of the flow passage through the valve spool.

In one preferred embodiment the valve body is further provided with a balancing chamber open to the valve spool at a position where the valve spool is diametrically opposed to the valve body inlet so that the force of the inlet pressure, tending to push the valve spool against one side of the bore is offset by pressure within the balancing chamber to negate the force at the valve body inlet. A conduit provides for fluid communication between the inlet to the valve body and the balancing chamber.

In other preferred embodiments the valve spool and the valve body are each provided with plural fluid passages which are selectively opened and closed as the valve spool slides relative to the valve body.

In another preferred embodiment the fast-acting valve of the present invention is in the form of a poppet valve for mounting in the head of a combustion chamber to control inlet of a fuel/air mixture or outlet of an exhaust gas.

In yet another preferred embodiment the fast-acting valve of the present invention is a cartridge valve which may be utilized in series with a fuel injection nozzle to form a fuel injection system.

DESCRIPTION OF THE PREFERRED EMBODIMENTS

Figure 1A:
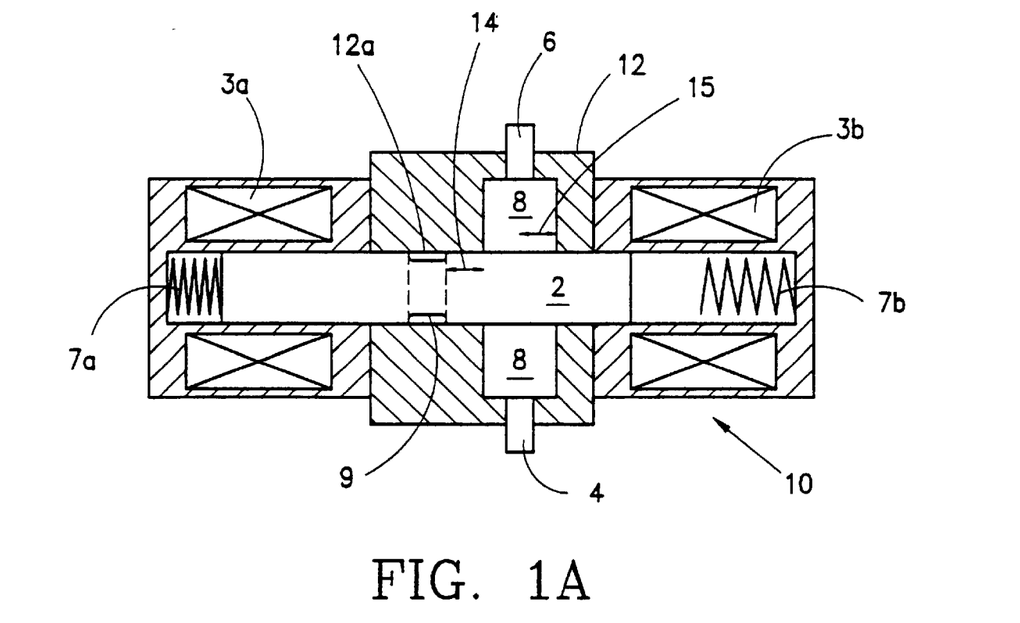
FIG. 1A is a cross-sectional view of a valve according to a first embodiment of the present invention in its "OFF" (closed) position.
Figure 1B:
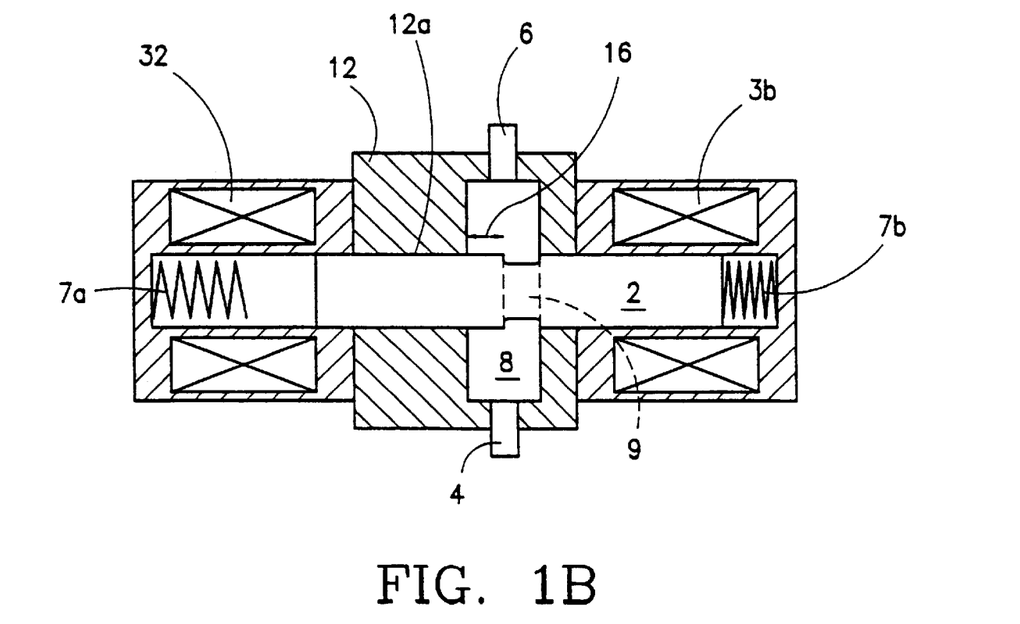
FIG. 1B is a cross-sectional view of the valve of FIG. 1A in its "ON" (open) position.

FIGS. 1A and 1B illustrate a first embodiment of the present invention. As shown in FIGS. 1A and 1B, the major components of the acceleration/deceleration spool valve 10 are the valve block 12 having an axial bore 12a, the slidable valve spool 2, solenoids 3a and 3b, fluid supply port 4, fluid discharge port 6, spool flow passage 9 and energy absorbing springs 7a and 7b.

FIG. 1A shows the spool 2 in its no-flow ("OFF") position. Pressurized fluid is present in fluid supply port 4 but is unable to flow to fluid discharge port 6 because flow passage 8 is blocked by the spool 2. Solenoid 3a is holding spool 2 in this position to offset the force of compressed spring 7a. When a command to open the valve is given, solenoid 3a terminates its holding force; solenoid 3b is activated to generate a force on the spool 2 and, in combination with the force being applied by spring 7a, initiates acceleration of the spool 2 from its leftmost position to the right. The spool 2 is accelerated through the first zone 14 which serves as an acceleration zone in movement toward opening and through which the spool accelerates to at least 30% of its maximum velocity and, more preferably to at least 50% of maximum velocity. In experimental tests spool speeds of over 90%, even 98% and 99%, maximum have been achieved prior to start of valve opening. Thus, the spool flow passage 9 reaches the leading edge of flow passage 8 traveling at a high speed and the valve opening event occurs very quickly. As spool 2 continues traveling to the right, it engages the energy absorbing spring 7b and begins its deceleration as the leading edge of flow passage 9 enters deceleration zone 15. Movement of spool 2 terminates as the leading edge of spool flow passage 9 reaches the trailing edge of flow passage 8, at the position shown in FIG. 1B. To terminate fluid flow, the reverse process is employed. Solenoid 3b is disengaged, solenoid 3a is engaged and the spool 2 begins acceleration from the rightmost position shown in FIG. 1B to the leftmost position shown in FIG. 1A. The acceleration zone to terminate fluid flow is zone 16 in FIG. 1B.

Figure 2:
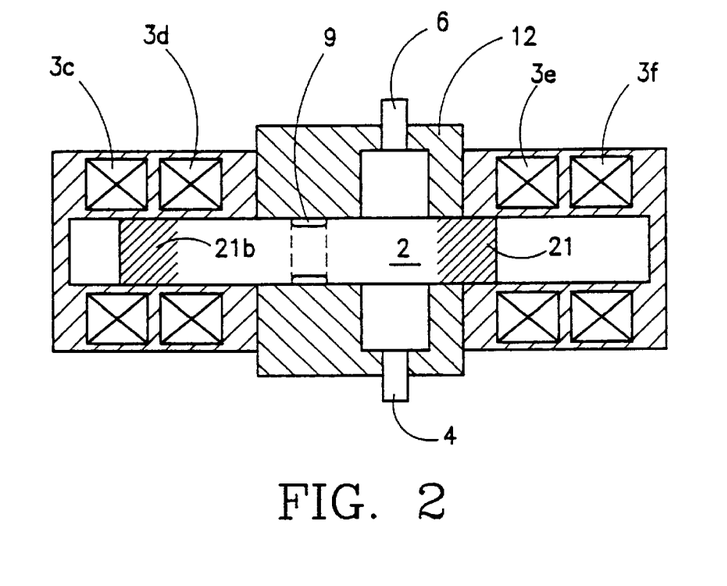
FIG. 2 is a cross-sectional view of a valve according to a second embodiment of the present invention in its closed position.

In a second embodiment, as depicted in FIG. 2, multiple solenoids 3c, 3d, 3e, 3f are used in series, with 3c and 3d at one end 3e and 3f at the other, to maximize the accelerating force on the spool through its entire acceleration zone. In this second embodiment, to accelerate spool 2 to the right, solenoid 3e is energized and acts on that part 2a of spool 2 which responds to the magnetic force. Solenoid 3d may also be energized to maximize the initial force on the spool as it acts on part 2b of spool 2. As the rightmost end of spool 2 passes solenoid 3e and its accelerating force is diminished, current to solenoid 3e is terminated (and current to solenoid 3d is also terminated), and solenoid 3f is energized to continue force on spool 2 through the entire acceleration zone. As the valve spool clears the acceleration zone, the opposing solenoids can be energized to create a reverse force on the valve spool, thereby decelerating the valve spool as it approaches the rest position. Thus, in this embodiment, if the current to the solenoids is reversible, the solenoids can be used both to accelerate and decelerate, thus dispensing with need for separate acceleration/deceleration means, e.g. springs. To reverse the movement of spool 2 from its rightmost position to its leftmost position, the reverse process is employed. Current to solenoid 3f is terminated and solenoids 3e and 3d are energized. As the leftmost end of spool 2 passes solenoid 3d, current to solenoids 3d and 3e is terminated, and solenoid 3c is energized until spool 2 reaches its leftmost position.

Figure 3:
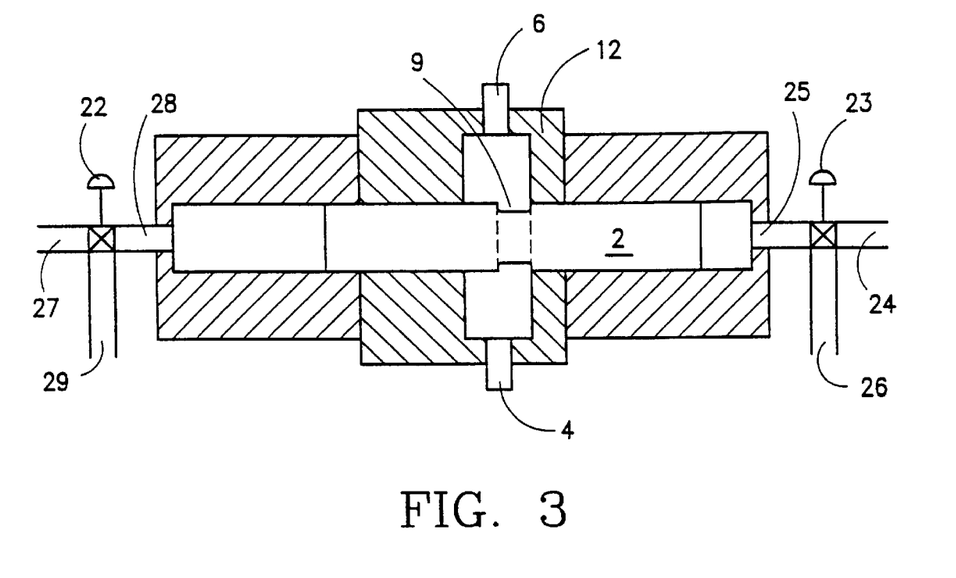
FIG. 3 is a cross-sectional view of a valve according to a third embodiment of the present invention in its open position.

Another modification would be to use means other than solenoids to provide the primary forces to accelerate the spool (or movable component in other embodiments). For example, FIG. 3 shows a third embodiment which utilizes hydraulic pressure to provide force for acceleration of spool 2. Spool 2 is shown in its rightmost position. To accelerate spool 2 to the left, valve 23 opens high pressure line 24 to spool port 25 while disconnecting low pressure line 26 from spool port 25. Valve 22 at the same time closes high pressure line 27 from spool port 28 while connecting low pressure line 27 to spool port 28. The high pressure hydraulic fluid acts on the right end of the spool 2, accelerating it to the left while fluid in the volume left of spool 2 flows from spool port 28 through valve 22 to low pressure line 29. To accelerate spool 2 from its leftmost position to the right, the reverse process is employed.

In yet another modification the springs would be deleted to minimize the "hold" force required of the solenoids (especially for applications where the valve will be in either the on or off position for an extended time) and other means would be used to decelerate the spool, such as, "hydraulic stops".

Figure 4A:
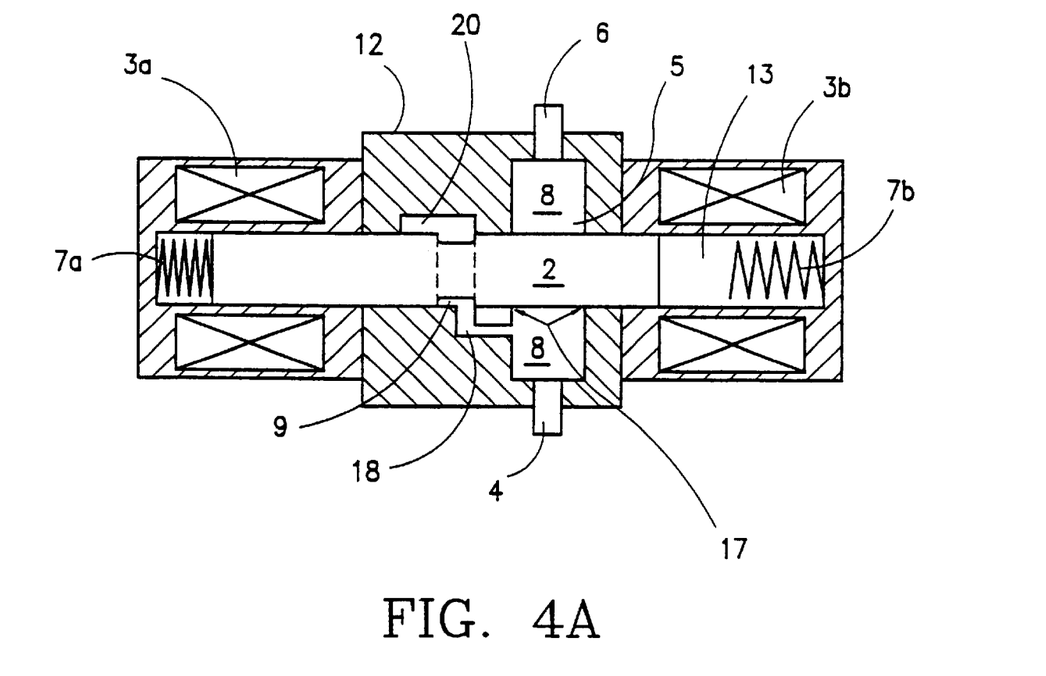
FIG. 4A is a cross-sectional view of a valve according to a fourth embodiment of the present invention in its "OFF" (closed) position.
Figure 4B:
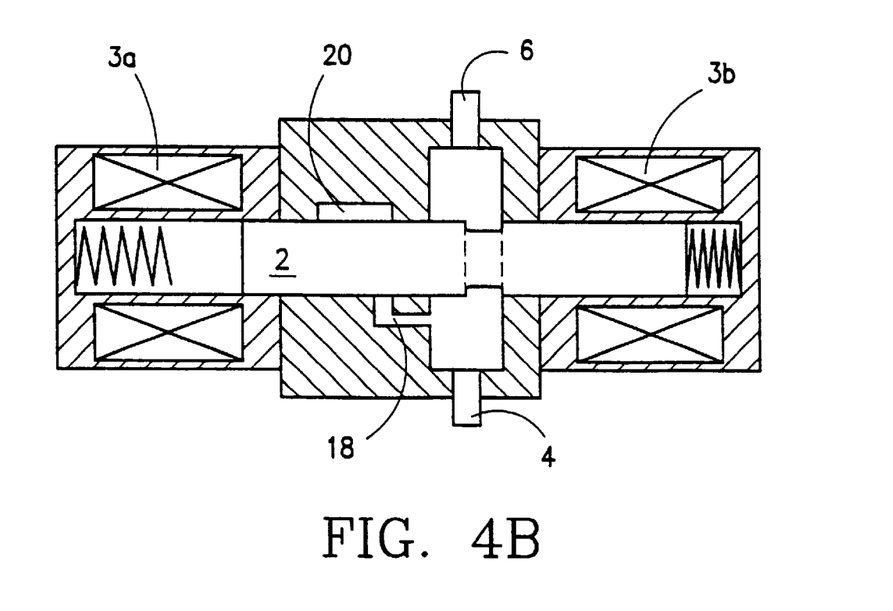
FIG. 4B is a cross-sectional view of the valve of FIG. 4A in its "ON" (open) position.

A fourth embodiment of the invention employs hydraulic force balancing on the spool to minimize the friction opposing movement of the spool. FIGS. 4A and 4B show one means of providing hydraulic balance for the valve described in FIG. 1. In the off position, (FIG. 4A) fluid from the high pressure fluid supply port 4 acts on a bottom portion of the cylindrical surface of the spool 2 which increases the force of a top portion of the spool on the valve block 12 which increases friction when movement of the spool occurs, since the fluid discharge port 5 is likely to be at much lower pressure. By providing fluid at the same pressure as the fluid in the fluid supply port 4 to an area of the top portion of the spool that is equal to the area exposed to the bottom face of the spool through the fluid supply port 4, hydraulic balancing results. Accordingly, a fluid passage 18 connects the fluid supply port 4 to spool flow passage 9 in the valve off position. Fluid at the high pressure within port 4 is thereby provided to balancing port 20 to provide hydraulic balance. As the spool accelerates, the spool flow passage 9 moves beyond balancing port 20 and pressure begins to dissipate in balancing port 20 because it no longer is in direct communication with fluid supply port 4 and some leakage inherently will occur. As the spool flow passage 9 enters flow passage 8, high pressure fluid from fluid supply port 4 comes into direct communication with fluid discharge port 6 and hydraulic balance resumes. The surface area of spool 2 exposed to balancing port 20 is approximately equal to the surface area of spool 2 exposed to flow passage 8 on the side of inlet port 4 when the valve is in the off position shown in FIG. 4A.

Figure 5A:
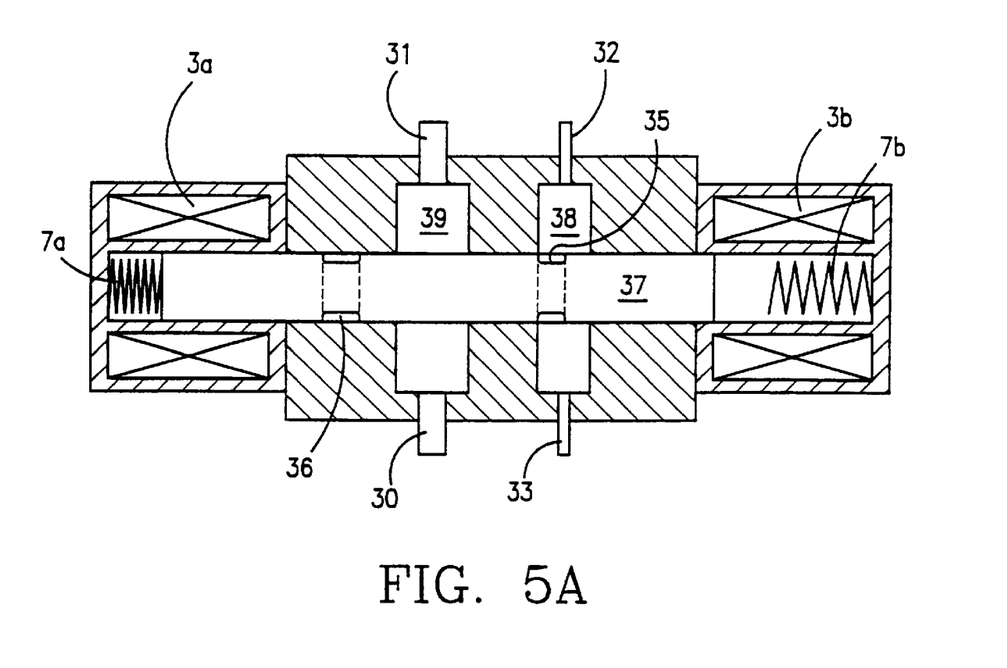
FIG. 5A is a cross-sectional view of a valve according to a fifth embodiment of the present invention in its "OFF" (closed) position.
Figure 5B:
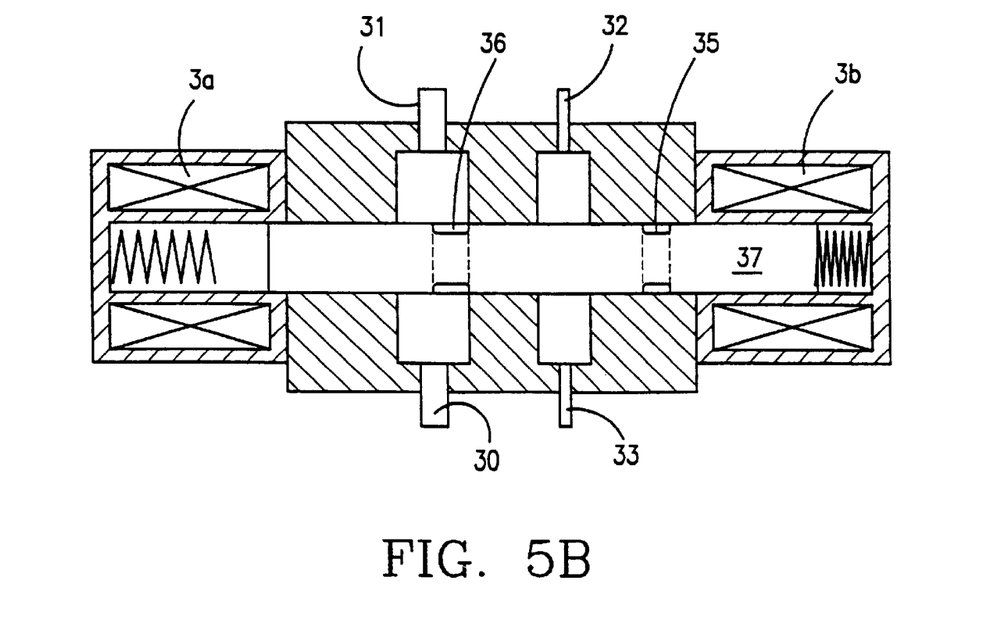
FIG. 5B is a cross-sectional view of the valve of FIG. 5A in its "ON" (open) position.

A fifth embodiment of the invention is shown in FIGS. 5A and 5B. The operation of this valve will be described as it could be applied to the control of fuel (i.e., fluid) injection directly into the cylinder of an internal combustion piston engine.

Fluid supply port 30 is supplied with high pressure fuel. Fuel discharge port 31 is connected to a pressure-actuated fuel injector (not shown). Fuel vent port 32 is connected to fuel discharge port 31, or is connected to the line (not shown) connecting the fuel discharge port 31 to the fuel injector, or is connected directly to the fuel injector. Fuel return port 33 returns vented fuel to the fuel tank (not shown).

FIG. 5A shows the valve in the "off" position. When a command is given to inject fuel, solenoid 3a is disengaged, and solenoid 3b is engaged. Acceleration occurs as previously described in connection with FIG. 1A. Spool flow passage 35 passes beyond valve block flow passage 38 as spool flow passage 36 begins to enter valve block flow passage 39 and fuel is quickly supplied to the injector through fuel discharge port 31. Deceleration occurs as described in connection with FIG. 1A. FIG. 5B shows the spool 37 at rest in the valve "on" position. When a command is given to terminate the injection of fuel, solenoid 3*b* is disengaged, and solenoid 3*a* is engaged. As spool flow passage 36 passes beyond fuel valve block flow passage 39, spool flow passage 35 enters valve block flow passage 38, and the injector pressure is quickly vented, providing a clean, quick termination of the injection event.

Figure 6A:
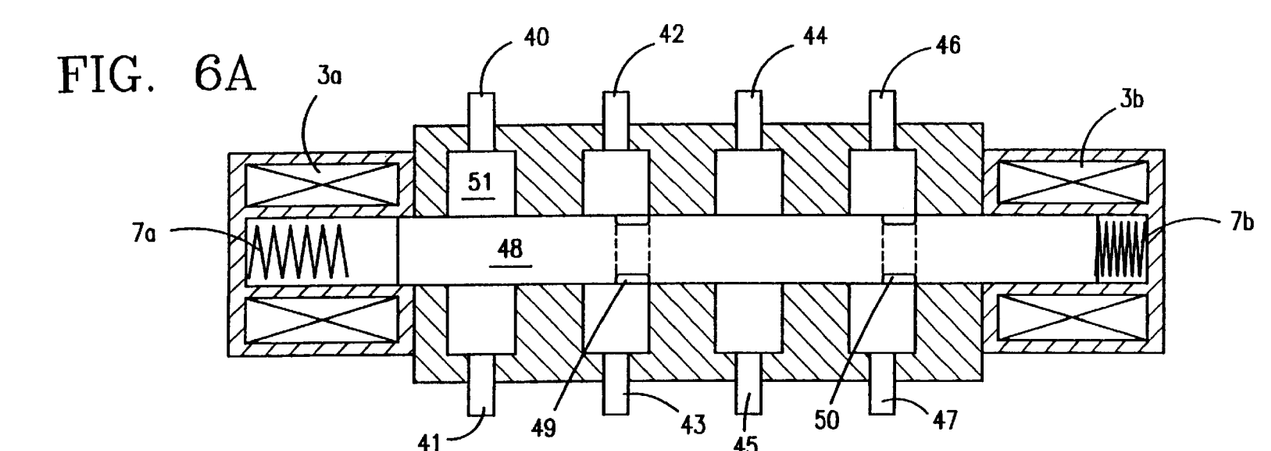
FIG. 6A is a cross-sectional view of a valve according to a sixth embodiment of the present invention in its "OFF" (closed) position.
Figure 6B:
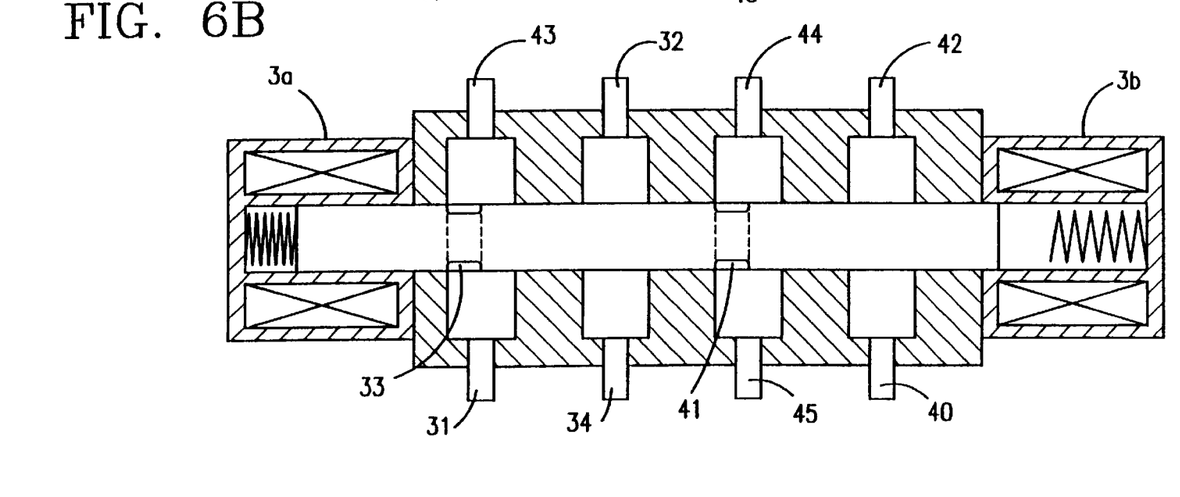
FIG. 6B is a cross-sectional view of the valve of FIG. 6A in its "ON" (open) position.
Figures 7A, 7B, 8:
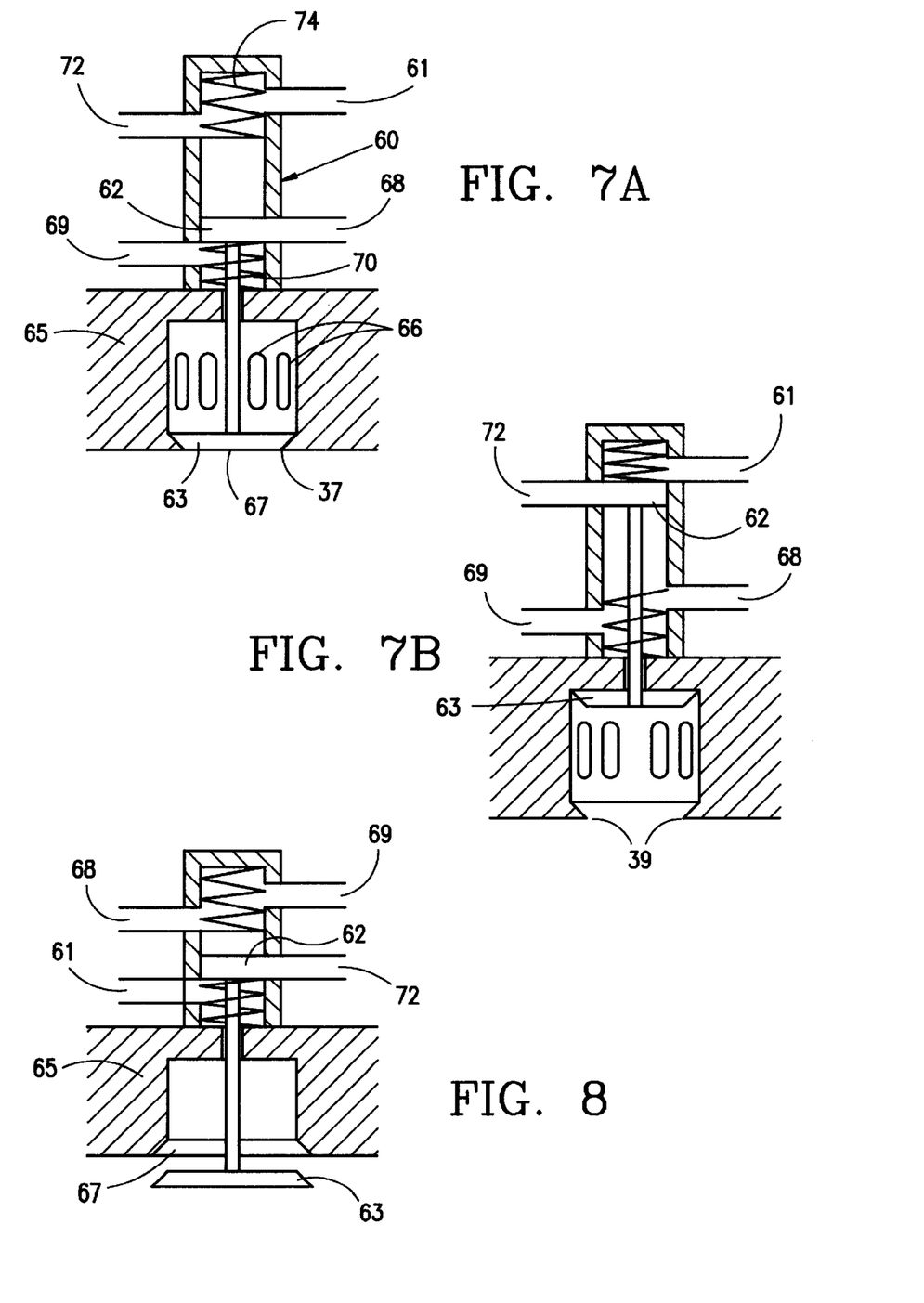
FIG. 7A is a cross-sectional view of a valve according to the seventh embodiment of the present invention in its "OFF" (closed) position.
FIG. 7B is a cross-sectional view of the valve of FIG. 7A in its "ON" (open) position.
FIG. 8 is a cross-sectional view of a valve according to the eighth embodiment shown in FIGS. 7A and 7B.

A sixth embodiment of the invention is shown in FIGS. 6A and 6B. FIGS. 7A and 7B show, as a seventh embodiment, an acceleration/deceleration gas flow valve that includes a fast actuator 60 which would be controlled by the valve of FIGS. 6A and 6B.

FIG. 6A shows the control valve spool 48 in the position which will result in the gas flow valve of FIG. 7A being in the closed position. Considering FIGS. 6A and 7A together, high-pressure fluid is supplied to ports 41 and 42. With the spool flow passage 49 providing fluid communication between port 42 and port 43, and port 43 connected to port 61 of the fast actuator 60, high-pressure fluid has acted on hydraulic piston 62 to move the poppet valve 63 against its seat 64, formed in cylinder head 65 closing a combustion chamber formed in an engine block (not shown). With poppet valve 63 seated in seat 64 the flow of gas between gas ports 66 and port 67 formed in cylinder head 65 is blocked. In order for the hydraulic piston 62 to travel to its lowermost position as shown in FIG. 7A, hydraulic fluid on the bottom side of hydraulic piston 62 flows out port 68 and, with port 68 connected to port 47, discharge fluid flows through spool flow passage 50 to port 46 which is connected to a low-pressure fluid storage tank (not shown).

When a command is given for the gas flow valve of FIG. 7A to open, solenoid 3*b* is disengaged, solenoid 3*a* is engaged, and the control valve spool 48 is first accelerated, and then decelerated to a stop in the position shown in FIG. 6B in the manner previously described in connection with FIG. 1B. As spool flow passage 49 enters valve block flow passage 51 it comes into communication with high-pressure fluid supply port 41, high-pressure fluid flows to port 40 and, with port 40 connected to port 69, high-pressure fluid acts on the bottom side of hydraulic piston 62 which, with the assistance of energy-absorbing spring 70, begins acceleration of poppet valve 63. Poppet valve 63 reaches a high speed as it approaches gas ports 66 and thus provides rapid opening. With ports 68 and 61 unable to permit the flow of fluid through the control valve, fluid on the top side of the hydraulic piston 62 must flow from port 72 to port 44 through spool flow passage 50 to port 45 which, like port 46, is connected to a low-pressure fluid storage tank (not shown). As the hydraulic piston 62 reaches energy absorbing spring 74, poppet valve 63 has passed to a position above gas ports 66, and deceleration can begin. As hydraulic piston 62 compresses energy absorbing spring 74 and begins to close port 72, it rapidly decelerates until it stops at a position (FIG. 7B) where it has closed port 72, and fluid can no longer flow. The poppet valve 63 acting in the manner of the acceleration/deceleration spool valve of FIGS. 1A and 1B, provides very fast initiation of gas flow during opening and very fast termination of gas flow during closing. The pressure/port arrangement described above for the acceleration/deceleration control valve of FIGS. 6A and 6B provides hydraulic balancing of the control valve.

The eighth embodiment shown in FIG. 8 is modification of the seventh embodiment wherein the poppet valve 63 shown in FIGS. 7A and 7B is replaced by a conventional poppet valve actuated hydraulically and controlled by the acceleration/deceleration valve of FIGS. 6A and 6B, in the same manner described for the valve of FIGS. 7A and 7B, but without the acceleration/deceleration features of the gas flow control valve of FIGS. 7A and 7B.

Figure 9A:
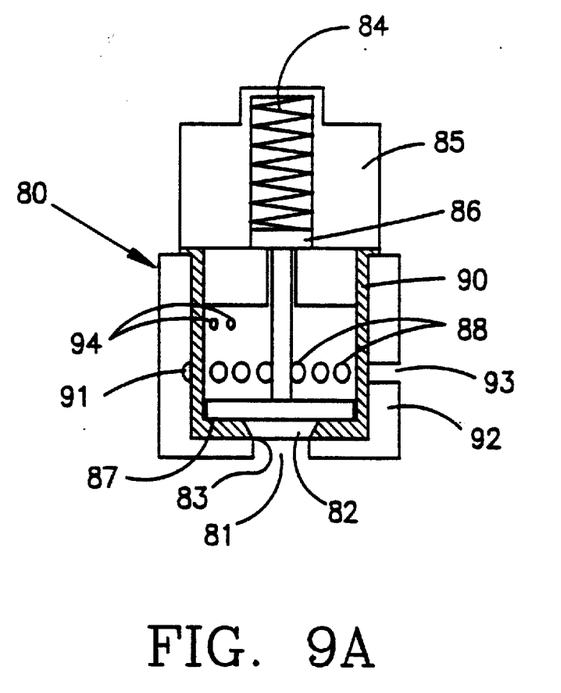
FIG. 9A is a cross-sectional view of a valve according to a ninth embodiment of the present invention.
Figure 9B:
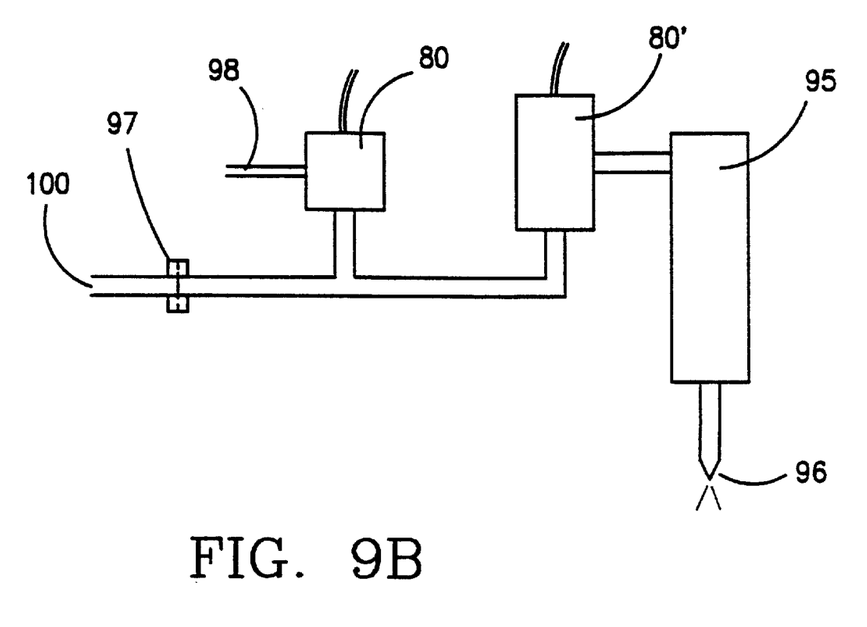
FIG. 9B is a schematic diagram of a fuel injection system including two valves in accordance with the ninth embodiment illustrated in FIG. 9A.

A ninth embodiment of the valve of the present invention is shown on FIG. 9A; and FIG. 9B shows how this valve could be used to create a unique fuel (or other fluid) injection system. The acceleration/deceleration control valve 80 shown in FIG. 9A is of the two-way cartridge type. High pressure fuel would be supplied to the supply port 81. In its maximum down position, poppet valve 82 would remain seated against its seat 83, preventing the flow of fuel. Spring 84 must be strong enough to hold poppet valve 82 in its maximum down position and must offset the force created by the high pressure fuel acting on the exposed face of poppet valve 82 at supply port 81. When a command to open is given, solenoid 85 is engaged and acts on poppet valve piston 86 to accelerate poppet valve 82 in the upward direction. As poppet valve 82 begins to move, high pressure fuel flows in through supply port 81 and accesses the larger area of the bottom face 87 of poppet valve 82. This additional force on valve 82 greatly increases its acceleration. As with the other embodiments of the acceleration/deceleration valve, a high speed is reached before the bottom face 87 of the poppet valve 82 crosses the exit ports 88, located in the cartridge valve body 90, thus providing a rapid opening of valve 80. The valve block 92 then collects the fuel flow through exit ports 88 in flow passage 91 and allows fuel flow to continue through block port 93. Poppet valve 82 begins deceleration after the bottom face 87 of the poppet valve 82 crosses the top of exit ports 88, due to compression of spring 84 and the closing of vent ports 94 (as more fully described with reference to FIGS. 7A and 7B) by poppet valve 82. Poppet valve 82 is held in its uppermost position by solenoid 85 and/or the force of the high pressure fuel on the exposed face of poppet valve 82, and fuel flows to the injector. As will be described in greater detail with reference to FIG. 9B, when a command to stop fuel flow to the injector is given, the fuel pressure below the exposed face of poppet valve 82 is reduced, and solenoid 85 is disengaged. Spring 84 acting on poppet valve 82 then causes downward acceleration of poppet valve 82, which first travels past and the closes exit ports 88 (and thus stops fuel flow) and then approaches seat 83. As poppet valve 82 approaches its lowermost position, fuel flow past seat 83 is being restricted by poppet valve 82 thereby providing a hydraulic means for rapid deceleration to its lowermost position.

FIG. 9B shows a line 100 for supplying fuel at a high pressure from a supply source (not shown), two control valves 80 and 80', as described in FIG. 9A, together with a pressure actuated fuel injector 95 and an orifice 97, which in total are a unique fuel injection system. When a command to inject fuel is given, valve 80' is opened very quickly in the manner described with reference to FIG. 9A, and fuel flows to injector 95, providing a very rapid beginning of injection (a very highly desired characteristic in direct fuel injection systems). Because it is the objective of fuel injection systems to provide the maximum system pressure drop across the nozzle orifice(s) 96 so that the best possible fuel atomization can occur, orifice 97 must be sized so as to not represent a significant restriction to flow when fuel is to flow through orifice(s) 96. When a command to terminate injection is given, the solenoid of valve 80' is disengaged and the solenoid of valve 80 is engaged. As was described in reference to FIG. 9A, valve 80 opens very quickly and allows the high pressure fuel between orifice 97 and orifice(s) 96 to be vented through port 98 and returned to the fuel tank (not shown). Orifice 97 then restricts the flow of fuel because the flow passage of valve 80 has a much larger flow area than orifice 97. This reduced line pressure: (1) causes very rapid and precisely controllable termination of flow across the injector orifice(s) 96 (very highly desired characteristics for direct fuel injection systems), and (2) allows valve 80' to close quickly because of the reduced pressure on the face of poppet valve 82, as described in reference to FIG. 9A. As valve 80' closes, the solenoid of valve 80 is disengaged so that valve 80 begins closing before fuel line pressure can be restored by flow through orifice 97. Valve 80 will shut more slowly than valve 80' because it will experience a relatively much higher pressure on the face of its poppet valve 82 than valve 80' experiences. However, fuel injection has already terminated and a somewhat longer closing time for valve 80 has little undesirable consequence.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A fast-acting valve comprising:
   a valve body having an axial bore;
   a cylindrical valve spool slidably mounted in said bore for reciprocating movement in a linear path between a fully closed position at one side of said valve body and a fully open position at a side of said valve body opposite said one side;
   at least one valve body fluid flow passage extending through said valve body between inlet and outlet ports and intersecting said bore;
   at least one valve spool fluid flow passage extending through said valve spool between openings at opposing locations in a cylindrical surface of said valve spool, said one valve body fluid flow passage being spaced from said one spool fluid flow passage with said valve spool in said fully closed position, to provide an acceleration zone through which said valve spool accelerates before said one spool fluid flow passage comes into fluid communication with said one valve body fluid flow passage and to provide a deceleration zone through which said valve spool is decelerated in advance of coming to rest in said fully open position, said acceleration zone having a length substantially longer than that required for sealing;
   first acceleration/deceleration means for accelerating said valve spool from fully closed position in travel through said acceleration zone toward said fully open position and for decelerating said valve spool in returning to said fully closed position;
   second acceleration/deceleration means for decelerating said valve spool in travel through said deceleration zone, approaching said fully open position and for accelerating said valve spool in leaving said fully open position; and
   motive means for driving said valve spool with said reciprocating movement.

2. A fact acting valve according to claim 1 wherein said first and second acceleration/deceleration means are springs.

3. A fast acting valve according to claim 2 wherein said acceleration and deceleration zones are equal in length to the distance a spring extends between a compressed state with said valve spool bearing against it in one of said fully closed and fully open positions and a relatively relaxed state with said valve spool in the other of said fully closed and fully open positions.

4. A fast acting valve according to claim 1 wherein said first and second acceleration/deceleration means are fluid chambers within opposing ends of said bore, each of said fluid chambers being in fluid communication with low pressure and high pressure lines through valves.

5. A fast acting valve according to claim 1 wherein said valve body fluid flow passage has a significantly larger diameter than said spool fluid flow passage.

6. A fast-acting valve according to claim 1 wherein said motive means comprises first and second solenoids respectively located at said one side and said opposite side of said valve body.

7. A fast-acting valve according to claim 6 wherein said first and second solenoids also serve, respectively, as said first and second acceleration/deceleration means.

8. A fast-acting valve according to claim 1 wherein said one spool fluid flow passage is fully closed by said valve body in said first limit position and is fully open to said one valve body fluid flow passage in said second limit position.

9. A fast-acting valve according to claim 1 wherein said one spool fluid flow passage is in fluid communication with said one valve body fluid flow passage when said valve spool is at said second limit position.

10. A fast-acting valve according to claim 1 wherein the length of said acceleration zone allows said valve spool to accelerate to at least 30% of maximum velocity in opening, before said one spool fluid flow passage comes into fluid communication with said one valve body fluid flow passage.

11. A fast-acting valve according to claim 1 further comprising:
    a balancing chamber formed within said valve body and open to contact with the cylindrical surface of said valve spool through an area diametrically opposed to an area of contact between the cylindrical surface of said valve spool and said valve body fluid flow passage on the side of said inlet port, the open area of said balancing chamber in communication with said valve spool being substantially equal to the area of communication between said valve spool and said valve body fluid flow passage with said valve spool located in said first limit position; and
    a balancing conduit providing fluid communication between said balancing chamber and said valve body fluid flow passage on the side of the inlet port.

12. A fast-acting valve according to claim 1 further comprising:
    a second valve body fluid flow passage extending through said valve body between inlet and outlet ports, said second valve body fluid flow passage being spaced from and parallel to said one valve body fluid flow passage; and
    a second spool fluid flow passage extending through said valve spool between openings at opposing locations in the cylindrical surface of said valve spool, said second spool fluid flow passage being spaced from and parallel to said one spool fluid flow passage.

13. A fast-acting valve according to claim 12 further comprising third and fourth valve body fluid flow passages, said one spool fluid flow passage selectively allowing fluid flow through said at first valve body fluid flow passage or said second valve body fluid flow passage and said second spool fluid flow passage selectively allowing flow through said third valve body fluid flow passage or said fourth valve body fluid flow passage.

14. A fast-acting poppet valve mechanism including a poppet valve for selectively allowing or blocking fluid flow through an axial port in a cylinder head closing a combustion chamber in an internal combustion engine, said poppet valve mechanism comprising:

an actuator comprising:
- a valve body having an axial bore having first, second, third and fourth ports extending radially from and in fluid communication with the bore;
- a piston slidably mounted in said bore for reciprocating movement between top and bottom limit positions, said first port being below said bottom limit position, said second port being closed by said piston in said bottom limit position, said third port being closed by said piston in said top limit position and said fourth port being above said top limit position; and
- first and second springs mounted within said bore, said first spring being compressed by said piston in said bottom limit position and relaxed with said piston being located in said top limit position and said second spring being compressed by said piston in said top limit position and relaxed with said piston in said bottom limit position; and a poppet valve comprising:
- a cylindrical valve chamber formed in the cylinder head with the axial port at one end thereof opening into the combustion chamber and a radial port spaced from said axial port; and
- a poppet valve member slidably mounted in said cylindrical valve chamber for movement between a lowermost limit position closing said axial port and an uppermost limit position clear of said radial port and where both said axial port and said radial port are open and in fluid communication with each other, said radial port being located intermediate said lowermost and uppermost limit positions, said lowermost limit position being spaced from said radial port so that said poppet valve member must travel through a predetermined distance upward from said lowermost limit position before reaching and subsequently uncovering said radial port, thereby opening the valve to allow fluid communication between and through said axial port and said radial port, and said uppermost limit position being spaced from said radial port so that said poppet valve member must travel through a predetermined distance downward from said uppermost limit position before reaching and subsequently uncovering said radial port thereby closing the valve by blocking fluid communication between said axial port and said radial port.

15. A fast-acting poppet valve mechanism according to claim 14 further including a control valve for operating the poppet valve, said control valve comprising:
- a control valve body having an axially extending bore and, intersecting said bore, first, second, third and fourth control valve passages extending in parallel through said control valve body between inlet and outlet ports;
- a cylindrical valve spool slidably mounted in said bore for reciprocating movement in a linear path between a first limit position at one side of said control valve body and a second limit position at a side of said control valve body opposite said one side;
- first and second spool fluid flow passages extending through said valve spool between openings at opposing locations in a cylindrical surface of said valve spool, said first and second fluid flow passages being respectively located in said second and fourth control valve passages to allow flow therethrough, while first and third control valve passages are closed by said valve spool, with said valve spool in said second limit position and respectively located in said first and third control valve passages to allow flow therethrough, while said second and fourth control valve passages are closed by said valve spool in said first limit position;

wherein:
- said first control valve passage is connected to said first port for introduction of a high pressure fluid thereto;
- said second control valve passage is connected to said fourth port for introduction of a high pressure fluid thereto;
- said third control valve passage is connected to said second port for drainage of fluid pressure therefrom; and
- said fourth control valve passage is connected to said third port for drainage of fluid pressure therefrom.

16. A fast-acting two-way cartridge valve comprising:
- a valve body defining a cylindrical chamber with an axial port in a cylindrical end face of the cylindrical chamber, at least one radial port extending radially from the cylindrical chamber and a valve seat surrounding said axial port;
- a piston valve member slidably mounted in said cylindrical chamber for reciprocating movement between a closed limit position, where said piston valve member is seated in said valve seat blocking fluid communication between said axial and radial ports, and an open limit position where said piston valve member is clear of said radial port and axially opposite said axial port, relative to said radial port, allowing fluid communication between said axial and radial ports, said radial port being located axially intermediate said closed and open limit positions and axially spaced from said piston valve member in said closed and open limit positions to allow said piston valve member to accelerate in travel between said closed limit position and said radial port and in travel between said open limit position and said radial port; and
- bias means for biasing said piston valve toward said closed limit position.

17. A fuel injection system comprising:
- a fuel injection nozzle; and
- first and second fast-acting two-way cartridge valves, said first cartridge valve being connected in series with said fuel injection nozzle for supplying fuel at high pressure to said fuel injection nozzle and said second cartridge valve being connected in parallel with said first cartridge valve for releasing high pressure from said fuel injection nozzle, through said first cartridge valve, each of said first and second cartridge valves comprising:
  - a valve body defining a cylindrical chamber with an axial port in a cylindrical end face of the cylindrical chamber and a radial port extending radially from the cylindrical chamber and a valve seat surrounding said axial port;
  - a piston valve member slidably mounted in said cylindrical chamber for reciprocating movement between a closed limit position, where said piston valve member is seated in said valve seat blocking fluid communication between said axial and radial ports, and an open limit position where said piston valve member is clear of said radial port and axially opposite said axial port, relative to said radial port, allowing fluid communication between said axial and radial ports, said radial port being located axially intermediate said closed and open limit positions and axially spaced from said piston valve member in said closed and open limit positions to allow said piston valve member to accelerate in travel between said closed limit position and said radial port and in travel between said open limit position and said radial port; and bias means for biasing said piston valve toward said closed limit position.

18. A fuel injection system according to claim 17 further comprising:

conduits connecting said fuel injection nozzle with a high pressure fuel source and a low pressure fuel reservoir through said first and second cartridge valves; and orifice means located in one of said conduits between said high pressure fuel source and said first and second cartridge valves.

19. A fast-acting valve comprising:

a valve body having an axial bore;

a cylindrical valve spool slidably mounted in said bore for reciprocating movement in a linear path between a fully closed position at one side of said valve body and a fully open position at a side of said valve body opposite said one side;

at least one valve body fluid flow passage extending through said valve body between inlet and outlet ports and intersecting said bore;

at least one valve spool fluid flow passage extending through said valve spool between openings at opposing locations in a cylindrical surface of said valve spool;

at least two solenoids in series, located at said one side and at least two solenoids in series located at said opposite side, surrounding said bore, for alternately accelerating and decelerating said valve spool in travel between said fully closed and fully open positions.

20. A fast-acting poppet valve mechanism for selectively allowing or blocking fluid flow through an axial port in a cylinder head closing a combustion chamber in an internal combustion engine, said poppet valve mechanism comprising:

a cylindrical valve chamber formed in the cylinder head with the axial port at one end thereof opening into the combustion chamber and at least one radial port spaced from said axial port; and a poppet valve member slidably mounted in said cylindrical valve chamber for movement between a lowermost limit position closing said axial port and an uppermost limit position clear of said radial port where both said axial port and said radial port are open and in fluid communication with each other, said radial port being located intermediate said lowermost and uppermost limit positions, said lowermost limit position being spaced from said radial port so that said poppet valve member must travel through a predetermined distance upward from said lowermost limit position before reaching and subsequently uncovering said radial port, thereby opening the valve to allow fluid communication between and through said axial port and said radial port and said uppermost limit position being spaced from said radial port so that said poppet valve member must travel through a predetermined distance downward from said uppermost limit position before reaching and subsequently uncovering said radial port thereby closing the valve by blocking fluid communication between said axial port and said radial port.

\* \* \* \* \*